United States Patent [19]

Narahara et al.

[11] 3,786,176

[45] Jan. 15, 1974

[54] MAGNETIC RECORDING AND/OR REPRODUCING SYSTEM

[75] Inventors: Hisaaki Narahara; Toshihiko Numakura, both of Tokyo; Yoshimi Watanabe, Kanagawa-ken, all of Japan

[73] Assignee: Sony Corporation, Tokyo, Japan

[22] Filed: Nov. 13, 1972

[21] Appl. No.: 305,986

[30] Foreign Application Priority Data

Nov. 19, 1971 Japan ............................... 46/92801
Nov. 22, 1971 Japan ............................... 46/93830

[52] U.S. Cl. ............................................ 178/5.4 CD
[51] Int. Cl. .......................... H04n 5/78, H04n 9/02
[58] Field of Search ............... 178/5.4 CD, DIG. 28

[56] References Cited

UNITED STATES PATENTS

| | | | |
|---|---|---|---|
| 3,723,638 | 3/1973 | Fujita | 178/5.4 CD |
| 3,704,341 | 11/1972 | Fujita | 178/5.4 CD |
| 3,619,491 | 11/1971 | Fujita | 178/5.4 CD |
| 3,730,983 | 5/1973 | Numakura | 178/5.4 CD |

*Primary Examiner*—Richard Murray
*Assistant Examiner*—Fay Konzen
*Attorney*—Lewis H. Eslinger et al.

[57] ABSTRACT

An improved system for magnetic recording and/or reproducing a color television signal including a luminance signal and a chrominance signal which contains a burst signal therein. Before recording the television signal, the chrominance signal is frequency-converted to a frequency band lower than its original one and the burst signal is extracted from the chrominance signal. The burst signal is then combined with the luminance signal to frequency-modulate a carrier signal having a predetermined frequency, then both the frequency-converted chrominance signal and the frequency-modulated signal are recorded on a magnetic medium. When the magnetic medium is played back, the frequency-converted chrominance signal is frequency-reconverted to the original frequency band by means of a reference signal the phase of which is controlled by the burst signal reproduced by frequency-demodulation so that phase erros of the reproduced chrominance signal are diminished.

17 Claims, 5 Drawing Figures

MAGNETIC RECORDING AND/OR REPRODUCING SYSTEM

BACKGROUND OF THE INVENTION

1. Field of the Invention

This invention relates generally to a system for magnetic recording or reproducing or both. More particularly, the invention is directed to improvements in systems for magnetically recording and reproducing a color television signal, which has a luninance signal component and a chrominance signal component that includes a color synchronizing signal component.

2. Description of the Prior Art

In the recording of television signals on magnetic tape, the recording mechanism, known as a video tape recorder (VTR), usually has a rotary magnetic head around which the tape is wrapped along a section of a helical path. As the tape slides along this helical path, the head rotates and records television signal information on a series of parallel tracks disposed at an angle to the longitudinal direction of the tape. The same apparatus may be used to play back previously recorded information by means of heads that follow the recorded tracks.

The color television signals to be recorded are divisible both in frequency and in time. In terms of frequency they are divided into the luminance signal components, which occupy the relatively low frequency portion of the complete color television signal band, and the chrominance signal components and burst signals that occupy the relatively high frequency portions of the band. In terms of time, television signals are divided into field intervals, two of which make up a frame interval, and line intervals. Each line interval includes a blanking interval during which synchronization signals are transmitted to control the scanning apparatus of a color television receiver, and burst signals to synchronize the operation of sub-carrier signals generated in the television receiver.

It has been found heretofore that it is preferable to separate the luminance and chrominance signals before recording a color television signal. Following such separation, the luminance signal is used to frequency-modulate an oscillator, and the resulting frequency-modulated signal occupies a band somewhat higher than the original luminance signal band. The band of signals including the chrominance and burst signals is frequency-converted to a lower frequency band than the frequency-modulated signal. This rearrangement of the frequency bands occupied by the luminance and chrominance signals makes it possible to utilize the characteristics of the magnetic head and the magnetic tape to produce television pictures of high quality from a magnetic recording.

When a tape on which a signal has been recorded in the manner just described is played back, the chrominance signal component is reconverted to its original frequency band and the frequency-modulated signal is demodulated to produce the luminance signal component. A phase error of the reproduced chrominance signal caused by an error in the relative position of the rotary magnetic head and the angularly disposed tracks recorded on the tape, which phase error would appear as a jitter in the reproduced picture, is compensated for by utilizing the burst signals separated from the reproduced chrominance signal to control a reference signal that has a predetermined frequency and is used for reconverting the chroninance signal to its original band.

However, the burst signal contained in the chrominance band that is frequency-converted to a lower frequency band, is apt to be subjected to amplitude variations and phase variations during the recording and reproduction. For this reason, when the reference signal is phase-controlled by the frequency-converted burst signal, it is difficult to carry out the phase-control correctly because of the aforementioned relative positional error. The result is that it is difficult to obtain a chrominance signal component with no phase error.

It has been the practice to record the television signals on tracks slightly spaced apart on the tape to prevent information in one track from being inadvertently picked up as crosstalk when the adjadent track was being reproduced. The space between tracks is referred to as a guard band, and although it was deemed necessary to prevent crosstalk, it reduces the total surface area of the tape that can be used to record signals.

It has been proposed to avoid or minimize this loss of useful tape area by means of a system disclosed in detail in U.S. application, Ser. No. 277,815, filed Aug. 3, 1972 and assigned to the same assignee as the present application. According to that prior application, at least the chrominance signal, which is more likely to produce crosstalk since it is in a lower frequency band than the carrier frequency-modulated by the luminance signal, is recorded intermittently and on a basis such that it is not recorded in one track in an area directly adjacent an area where it is recorded in the next adjacent track. This means that each recorded interval is the same duration as the time between recorded intervals. In this way, the signal likely to produce crosstalk is not recorded and the guard bands between adjacent tracks may be reduced in width or eliminated entirely. If desired, both the chrominance and luninance signals may be recorded in this intermittent pattern.

In the reproducing equipment, the intermittently recorded signal is combined with a replica of itself that has been delayed for an interval equal to each of the recorded intervals. This combined signal re-establishes an uninterrupted television signal, although half of the signal information in the uninterrupted signal is repeated information.

Hereinafter, a description will be given of the case in which only the chrominance signal is intermittently recorded, or sampled, for alternate line intervals of time. Since the luminance signal is recorded as a frequency-modulated signal in a relatively high frequency band, it is unlikely to produce crosstalk even if it is recorded with no clearance between adjacent tracks or even with a partially overlapping area of adjacent tracks, provided the gap in the recording heads forming the adjacent tracks have different azimuth angles. The reproducing heads must also have corresponding aximuth angles. Since only alternate line intervals of the chrominance and burst signals are recorded, the burst signal reproduced in the reproducing equipment is apt to be subjected to phase deviation. In addition, the removal of alternate burst signals makes it more difficult to obtain proper control of the reference signal that is used to frequency-convert the chrominance signal. It is difficult to obtain stable and positive phase control of the reference signal as is necessary to obtain a reconverted chrominance signal of high quality and without any phase error.

Accordingly, it is one object of the present invention to provide an improved system for magnetic recording and reproducing of color television signals with maximum utilization of the magnetic tape and with good control of the phase of the reference signal, but with objectionable crosstalk.

It is another object of this invention to provide an improved magnetic recording system for color television signals in which the chrominance signal is recorded and reproduced substantially free of phase errors.

It is still another object of this invention to provide an improved magnetic reproducing system for color television signals to obtain reproduction of the chrominance signals substantially without phase errors.

Other objects, features, and advantages of this invention will become apparent from the following detailed description taken in conjunction with the accompanying drawings.

SUMMARY OF THE INVENTION

In accordance with the present invention, a color television signal is separated into its luminance and chrominance signal components. The burst signal is obtained form the chrominance signal band and is added to the luminance signal to form a combined signal that is used to frequency-modulate a carrier wave. The chrominance signal is converted to a lower frequency band than that occupied by the frequency-modulated signal and is combined with the frequency-modulated signal to be recorded on a magnetic medium.

The amplitude of the burst signal may be used to control the gain of the luminance signal prior to extraction of the burst signal. This minimizes phase distortion of the burst signal.

The burst signal may be extracted from the chrominance signal prior to frequency-conversion of the latter and must then be separately frequency-converted before being combined with the luminance signal.

If the chrominance signal is to be gated so that only alternate line intervals of it will be recorded, the burst signal may be extracted from the chrominance signal prior to the gating and combined with the luminance signal. In this way, alternate burst signals will not be deleted by the gating operation.

In the reproducing system, the frequency-modulated signal is demodulated and the burst signal is removed, thereby leaving only the reproduced luminance signal. The separated burst signal, usually after frequency-reconversion, is used to control the phase of a reference signal generator that produces the necessary signal to reconvert the frequency of the chrominance signal from the low frequency band, in which it was recorded, to its original higher frequency band. The reconverted chrominance signal is then combined with the demodulated luminance signal to form a reconstituted color television signal.

The amplitude of the burst component that has been frequency-converted as part of the chrominance signal and has been reconverted, is measured and used to control the gain of the chrominance channel in the reproducing system.

DESCRIPTION OF THE PREFERRED EMBODIMENTS

Figure 1:
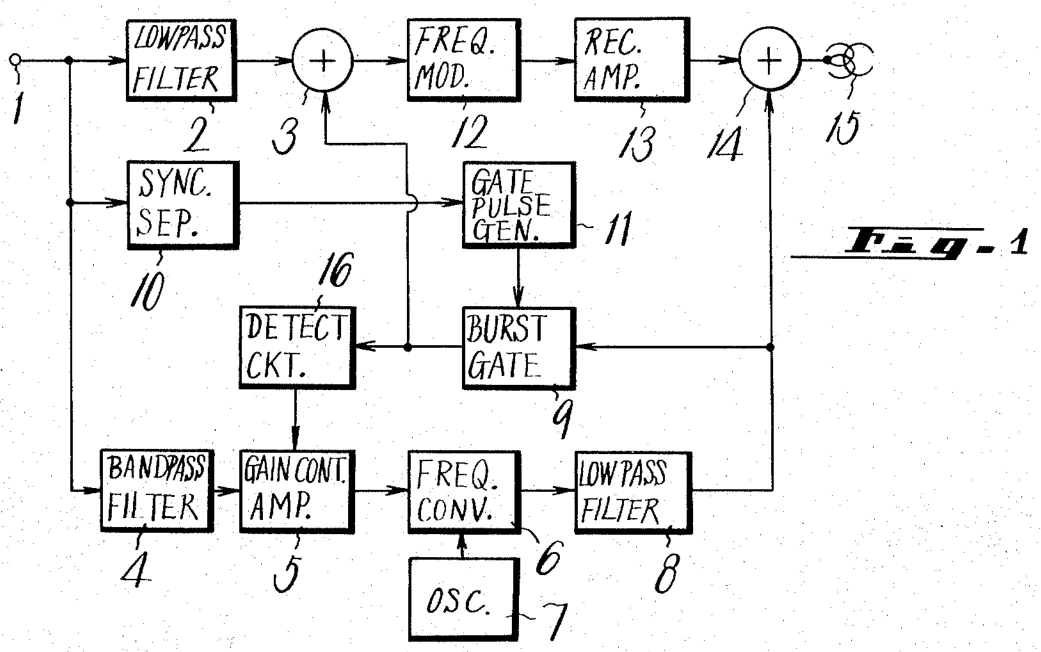
FIG. 1 is a schematic block diagram showing one embodiment of a recording system in accordance with the present invention.

In FIG. 1 a color television signal is applied by way of an input terminal 1 to a low-pass filter 2 to separate the luminance signal component from the complete signal. The luminance signal is then applied to a mixer 3. The color television signal is also applied to a band-pass filter 4 to separate out the band that includes the chrominance and burst signals. These signals are then applied through a gain-control amplifier 5 to a frequency converter 6 that converts them to a lower frequency band such that the carrier frequency of the chrominance signal is shifted to a relatively low frequency, such as 560 KHz, for example. The conversion is accomplished by means of a signal from an oscillator 7. The chrominance signal component thus frequency-converted is then passed through a low-pass filter 8 and applied to a burst-gate circuit 9.

The color television signal is also applied to a synchronizing signal separator 10 to separate out the horizontal synchronizing signal, which is then applied to a burst-gate pulse generating circuit 11. The latter produces a burst-gate pulse which is applied to the burst-gate circuit 9 to allow only the burst signals of the frequency-converted chrominance and burst signals to pass through to the mixer 3 during horizontal blanking intervals. The mixer combines the luminance signal component with the frequency-converted burst signal, and this combined signal is applied to a frequency modulator 12 to modulate a carrier signal having a predetermined frequency. The frequency-modulated signal is applied through a recording amplifier 13 to a second mixer 14 that also receives the frequency-converted chrominance signal from the lowpass filter 8. The mixer 14 combines both of these signals to produce a composite signal, which is applied to a magnetic head 15 to be recorded on a magnetic medium, usually tape, (not shown).

The frequency-converted burst signal is also applied by the burst-gate circuit 9 to a level-detecting circuit 16. The detected output signal from the circuit 16 is then applied to the gain control amplifier 5 in the chrominance channel to control the gain of the chrominance signal in accordance with a predetermined level of the burst signal.

Figure 2:
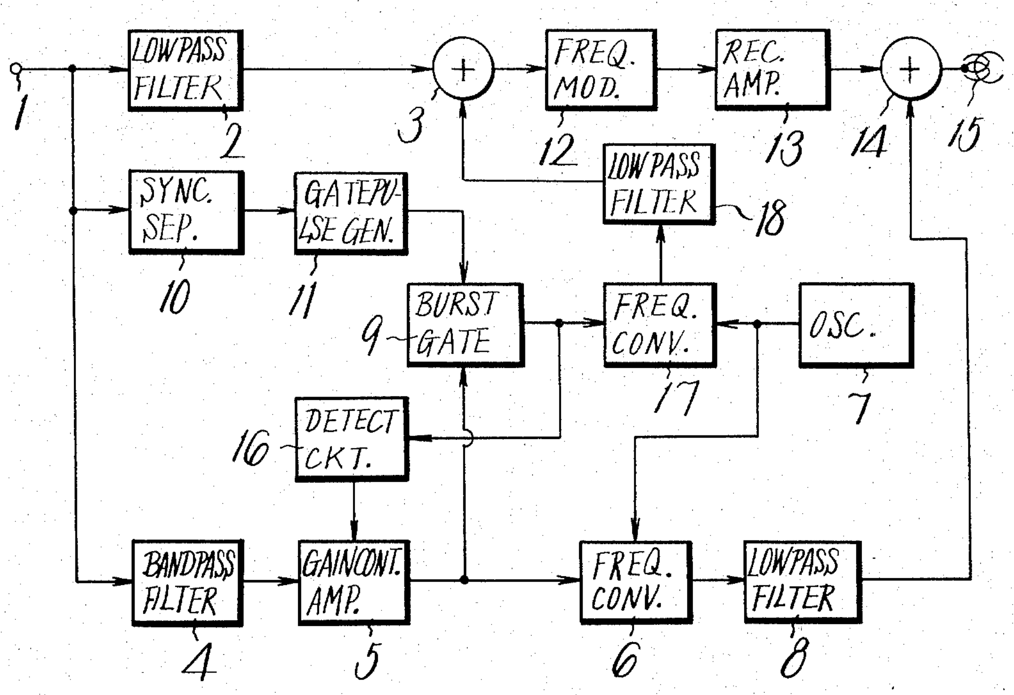
FIG. 2 is a schematic block diagram showing another embodiment of a recording system in accordance with the present invention.

In the embodiment in FIG. 2, the burst signal is subjected to frequency-conversion separately from the chrominance signal component. The chrominance signal output from the gain-control amplifier 5, which is ahead of the frequency-converter 5, is applied to the burst-gate circuit 9. The gate circuit allows only the burst signal to pass through and be applied to another frequency-converter 17. The same reference signal from the oscillator 7 is applied to both of the converters 6 and 17. The frequency-converted 17 thus converts the burst signal to a frequency of, for example, 560 KHz, and the converted burst signal is then applied to a low-pass filter 18. The output of the low-pass filter 18 is applied to the mixer 3. The remainder of the circuit is substantially the same as that of FIG. 1 and need not be described again.

Figure 3:
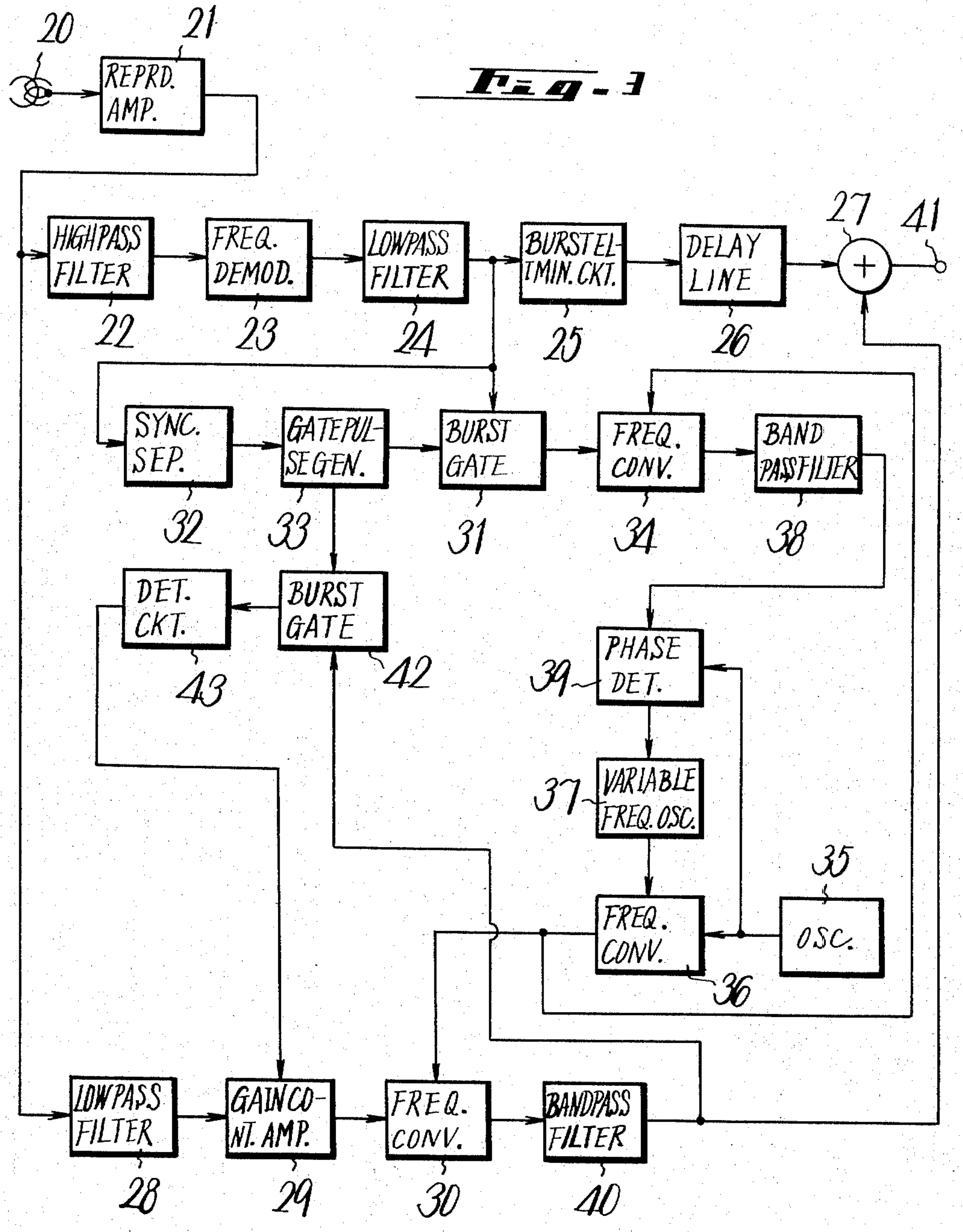
FIG. 3 is a schematic block diagram showing one embodiment of a reproducing system in accordance with the present invention.

FIG. 3 shows an embodiment of a reproducing system in which the reproduced output from a magnetic head 20 is amplified in a reproducing amplifier 21 and passed along to a high-pass filter 22. The output signal of the filter 22 is then demodulated by a frequency-demodulator 23. The output of the frequency-demodulator 23 is applied to a low-pass filter 24, and its output signal is the composite signal of the luminance signal component and the frequency-converted burst signal. The frequency-converted burst signal is within the frequency band of the reproduced luminance signal but causes to interference because it occurs during blanking intervals. The composite signal thus obtained is applied to a burst eliminating circuit 25 that permits only the luminance signal to pass through to a delay line 26 and a mixer 27. The delay line 26 delays the luminance signal in correspondence with the time delay caused to the chrominance signal.

The output of the reproducing amplifier 21 is also applied to a low-pass filter 28 which passes the frequency-converted chrominance signal. After this, the separated chrominance signal component is applied by way of a gain-control amplifier 29 to a frequency-converter 30. The mixed signal from the low-pass filter 24 is also applied to a burst-gate circuit 31 and to a synchronizing separator 32. The horizontal synchronizing signal separated out by the separator 32 is applied to a burst-gate pulse generating circuit 33 to produce a burst gate pulse. The burst-gate pulse is applied to the burst-gate circuit 31 which produces the burst signal frequency-converted to the previously-mentioned low frequency band. The frequency-converted burst signal from the gate circuit 31 is fed to a frequency-converter 34.

A signal of 3.58 MHz from an oscillator 35 is fed to a frequency-converter 36 which is also supplied with a signal having the required frequency of 560 KHz from a variable frequency oscillator 37. As a result, the frequency-converter 36 produces a reference signal of a frequency of 4.14 MHz. This reference signal is fed to the frequency-converter 34 to reconvert the burst signal to 3.58 MHz.

The reconverted burst signal is applied through a band-pass filter 38 to a phase detector 39 which is also supplied with the signal of 3.58 MHz from the oscillator 35. The phase detector 39 compares both the signals applied thereto and detects any phase deviation therebetween. The output of the phase detector 39 is fed to the variable frequency oscillator 37 to control its oscillation frequency, whereby the reference signal from the frequency converter 36 is controlled in frequency and hence in phase.

The reference signal from the frequency-converter 36 is then applied to the frequency-converter 30 which frequency-converts the chrominance and burst signals applied thereto to its original band with no phase deviation. The converted chrominance and burst signals from the frequency-converter 30 having a carrier and burst frequency reconverted to 3.58 MHz are then applied through a bandpass filter 40 to the mixer 27 in which the demodulated luminance signal and the reconverted chrominance and burst signals are combined. Thus, a reconstituted, complete color television signal is obtained at an output terminal 41.

The chrominance signal component from the band-pass filter 40 is also fed to a burst-gate circuit 42 to separate the burst signal therefrom to be applied to a level-detecting circuit 43. The output from the detecting circuit 43 is then applied to the gain control amplifier 29 to control its gain. Thus, the gain control amplifier 29 always produces the chrominance signal component with a predetermined amplitude.

With the system described above, since the phase control of the reference signal for frequency-reconverting the chrominance signal component during reproduction is carried out based upon the frequency-converted burst signal which is mixed with the luminance signal and angularly modulated before being recorded, the burst signal for phase control is not subjected to amplitude variation and pahse deviation. Accordingly, the phase control can be achieved in correct response to phase deviation of the signal which appears during recording and/or reproducing with the result that the reconverted chrominance signal component of high quality and with no phase error can be obtained.

Figure 4:
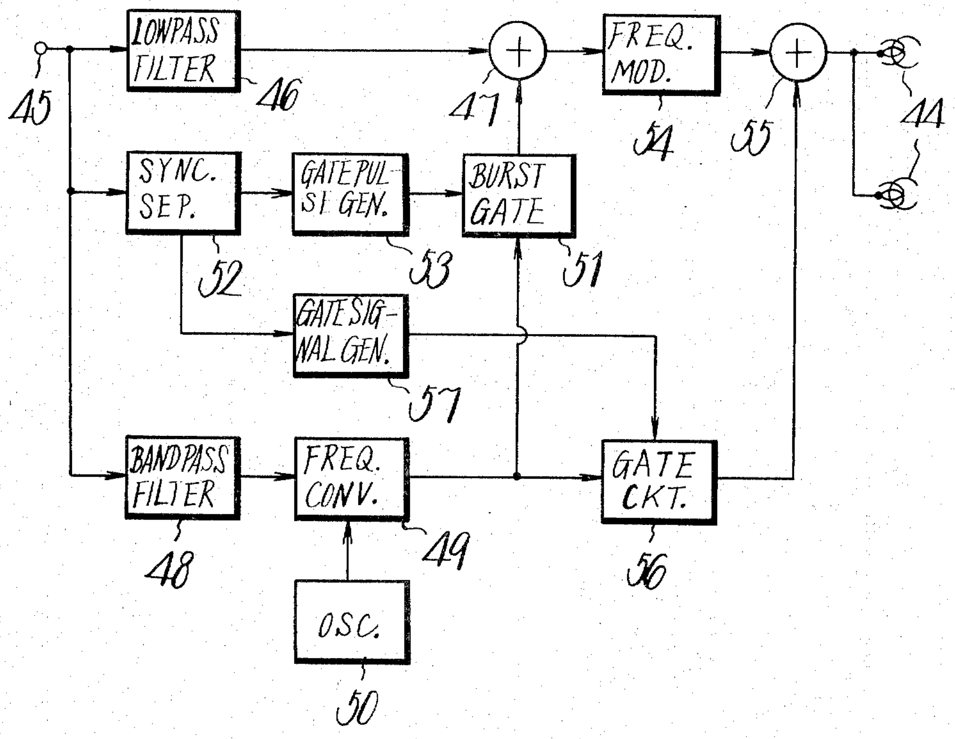
FIG. 4 is a schematic block diagram showing still another embodiment of a recording system in accordance with the present invention.

FIG. 4 shows a further embodiment of a recording system of the invention which samples the chrominance signal and records the intermittently sampled chrominance signal in order to increase the amount of recording area on the tape by omitting the so-called guard bands. In this embodiment, a color television signal applied to an input terminal 45 is fed to a low-pass filter 46 to separate therefrom the luminance signal, which is then fed to a mixer 47. The color television signal is also applied to a band-pass filter 48 to separate the chrominance signal component therefrom which is then fed to a frequency-converter 49, supplied with a reference signal from an oscillator 50. The frequency-converter 49 thus frequency-converts the chrominance signal component to a low frequency band. In accordance with the examples above, the chrominance signal may be converted to have a carrier frequency of, for example, 560 KHz. The chrominance signal component thus frequency-converted is fed to a burst-gate circuit 51. The color television signal is further applied to a synchronizing separator 52 to separate out a horizontal synchronizing signal which is then fed to a first gate pulse generating circuit 53 to obtain a burst-gate pulse. The burst-gate pulse is fed to the burst-gate circuit 51 which then produces, at every line interval, a burst signal frequency-converted to the low frequency band. The burst signal thus obtained is fed to the mixer 47 which combines the luminance signal with the frequency-converted burst signal to produce a combined signal. The combined signal is fed to a frequency-modulator 54 to frequency-modulate a carrier signal having a predetermined frequency. The frequency-modulated signal is then applied to a second mixer 55. The frequency-converted chrominance signal, including the burst signal, from the frequency-converter 49 is also applied to a gate circuit 56. The gate circuit is controlled by a gate signal from a gate signal generating circuit 57 which is supplied with the synchronizing signal from the synchronizing separator 52. The gate circuit 56 allows the frequency-converted chrominance signal to pass through to the mixer 55 during every other line interval to be combined therein with the modulated output from the frequency-modulator 54. The composite signal from the mixer 55 is fed to magnetic heads 44 to be recorded on a magnetic medium (not shown). At the same time, in the mixer 47 the frequency-converted burst signal is combined with the luminance signal during each horizontal blanking interval.

When the magnetic recording is played back, the frequency-converted burst signal is extracted from the demodulated output of the combined signal. This separated burst signal is used to control the phase of a reference signal for frequency-reconverting the chrominance signal to its original frequency band.

Figure 5:
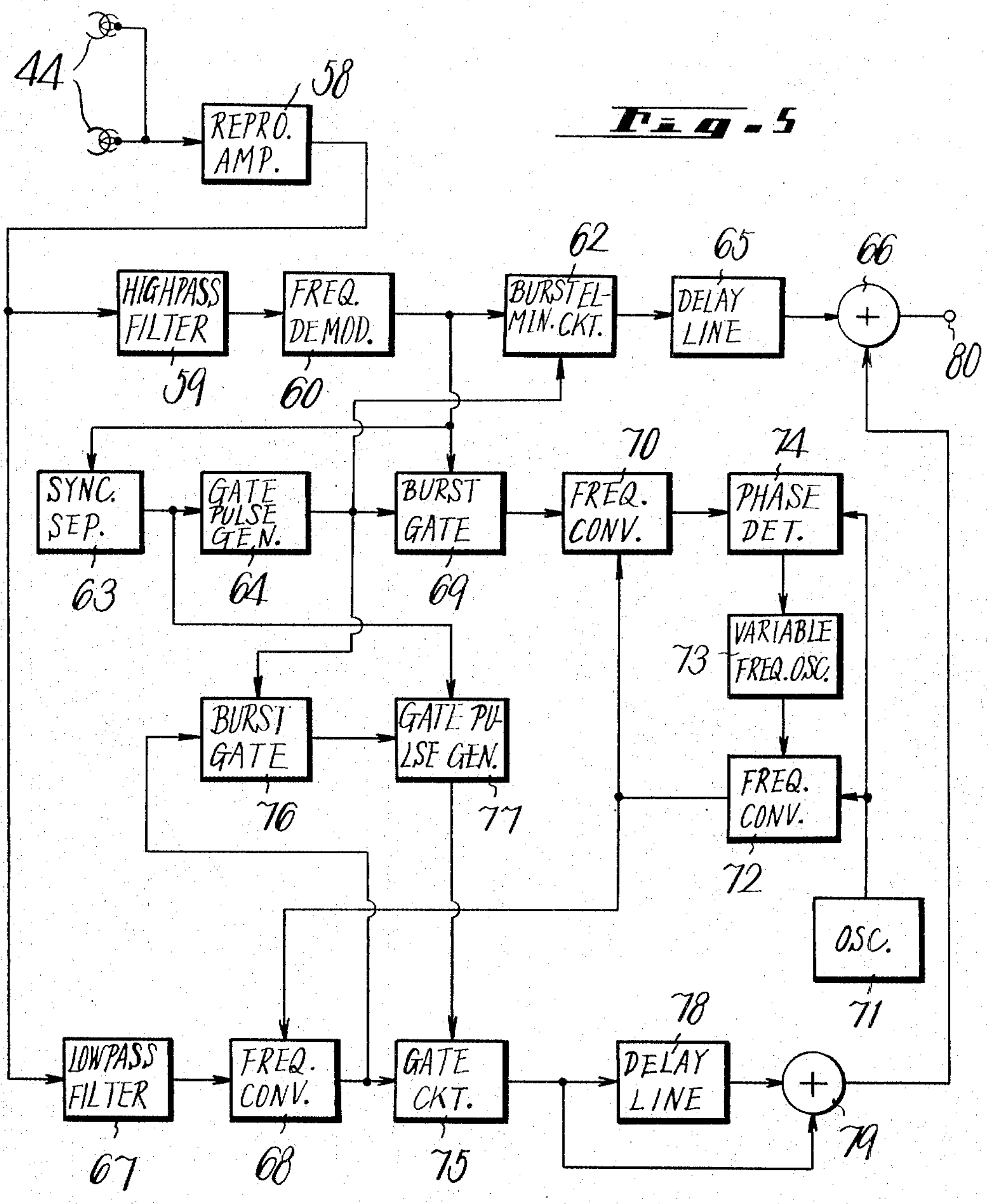
FIG. 5 is an embodiment of a reproducing system in accordance with the present invention which may be provided in conjunction with the recording system of FIG. 4.

FIG. 5 shows an embodiment of such a playback system according to the invention. A reproduced output from the magnetic heads 44 is fed through a reproducing amplifier 58 to a high-pass filter 59 which separates the frequency-modulated signal from the composite output signal of the amplifier 58. This frequency-modulated signal is then applied to a frequency-demodulator 60 to obtain the combined signal made up of the luminance signal and the frequency-converted burst signal. The combined signal is then applied to a burst-eliminating circuit 62 as well as to a synchronizing separator 63 which extracts a horizontal synchronizing signal. The horizontal synchronizing signal is fed to a burst-gate pulse generating circuit 64 which produces a burst-gate pulse. The burst-gate pulse is then applied to the burst-eliminating circuit 62 which permits only the luminance signal to pass through. The luminance signal is then fed through a delay line 65, which delays the luminance signal for a time that corresponds to the time that the chrominance signal is delayed. The output of the delay line 65 is applied to a mixer 66.

The output from the reproducing amplifier 58 is also fed to a low-pass filter 67, which separates the frequency-converted chrominance signal therefrom. This chrominance signal is then fed to a frequency-reconverter 68.

The combined signal from the frequency-demodulator 60 is also applied to a burst-gate circuit 69 which is controlled by the burst-gate pulse from the gate pulse generating circuit 64. Accordingly, the burst-gate circuit 69 delivers the frequency-converted burst signal to a frequency-converter 70 at the regular time during each line blanking interval. A signal of 3.58 MHz from an oscillator 71, is applied to a frequency-converter 72, which is also supplied with a signal of 560 KHz from a variable frequency oscillator 73. From these two signals, the frequency-converter 72 produces a reference signal of the frequency of 4.14 MHz, which is fed to the frequency-converter 70. The frequency-converter 70 thus reconverts the burst signal to 3.58 MHz. This reconverted burst signal is applied to a phase-detecting circuit 74 which is also supplied with the signal of 3.58 MHz from the oscillator 71. The phase-detecting circuit 74 phase-compares both of these signals to detect phase deviation of the reproduced signals. The output from the phase-detecting circuit 74 is applied to the variable frequency oscillator 73 to control the frequency of the output of the latter, whereby the frequency and hence the phase of the reference signal from the frequency-converter 72 are controlled.

The reference signal from the frequency-converter 72 is also applied to the frequency-converter 68 which, therefore, frequency-reconverts the chrominance signal component, with its phase deviation being compensated for, to its original frequency band with the carrier signal of 3.58 MHz. The chrominance signal from the frequency-converter 68 is applied to a gate circuit 75 as well as to a burst-gate circuit 76 which is controlled by the gate pulse from the gate pulse generating circuit 64. The burst-gate circuit 76 produces the burst signal at alternate line intervals, and this signal is applied to a gate pulse generating circuit 77 which is also supplied with the horizontal synchronizing signal from the synchronizing separator 63. The gate pulse generating circuit 77 produces a gate pulse which is reversed at every line interval for the time interval within which the chrominance signal component is reproduced. The gate pulse from the gate pulse generating circuit 77 is fed to the gate circuit 75 which produces the chrominance signal at every other line interval to eliminate the crosstalk introduced when the chrominance signal component does not exist. This chrominance signal, free from the crosstalk, is fed to a delay means 78 that delays it by one line interval and then feeds the delayed replica to a second mixer 79. The same intermittent chrominance signal is also fed directly to the mixer 79 and is combined therein with the delayed replica to produce a continuous chrominance signal. The continuous chrominance signal is fed to the mixer 66 which is also supplied with the luminance signal passed through a delay line 65 for delaying the luminance signal by an amount corresponding to the time the chrominance signal is delayed. The mixer 66 thus combines both the signal components applied thereto and delivers at an output terminal 80 a complete color television signal having the frequency the same as its original frequency.

With the present invention described above, when the color television signal is recorded, its chrominance signal component is recorded on the magnetic medium after being sampled, or gated, to make it possible to dispense with a so-called guard band so that the recording area on the magnetic medium can be much increased. Since, in the reproducing equipment, the phase control of the signal for frequency-converting the chrominance signal is carried out based upon the respective burst signal, which is frequency-converted to the low frequency band and combined with the luminance signal and recorded after frequency-demodulation, at every line interval, the phase control is stable and positive. It is thus possible to produce the chrominance signal with high quality with no phase error.

The present invention is not limited to the foregoing embodiments. It is also possible to record and/or reproduce the chrominance signal component with separate magnetic heads and to adapt the present invention to the case where signals are recorded on a rotary magnetic sheet.

What is claimed is:

1. A system for magnetic recording of a composite color television signal including a first band comprising a luminance signal and a second band comprising chrominance and burst signals, and being divided into intervals including field, line, and blanking intervals, said system comprising:

a. means for separating the luminance signal and the chrominance signal from the composite color television signal;

b. means for frequency-converting said separated chrominance signal to a frequency band lower than its original one;

c. means for extracting said burst signal from said frequency-converted chrominance signal;

d. means for combining said separated luminance signal and said extracted burst signal into a combined signal;

e. means for frequency-modulating a carrier signal by said combined signal to produce a frequency-modulated signal; and f. means for combining said frequency-modulated signal and said frequency-converted chrominance signal and for recording both of them on a magnetic medium.

2. The system according to claim 1, wherein said frequency-converting means converts the chrominance and burst signals to a substantially lower frequency band than said frequency-modulated signal.

3. The system according to claim 2, wherein said means for producing the combined signal combines said extracted burst signal with said separated luminance signal so that said burst signal occurs during a horizontal blanking interval.

4. The system according to claim 3 comprising, in addition, gating means for gating alternating substantially equal intervals of at least the chrominance signal to record only said gated intervals of the chrominance signal component.

5. The system according to claim 4, wherein said frequency-converting means is connected to said gating means for gating said frequency-converted chrominance signal component.

6. The system according to claim 5, wherein said gating means gates alternate line intervals of said frequency-converted chrominance signal.

7. A system according to claim 4 comprising, in addition, reproducing means to reproduce the signals recorded on said magnetic medium, said reproducing means comprising:

a. means for picking up said frequency-modulated signal and the recorded intervals of said frequency-converted chrominance signal from said magnetic medium;

b. means for frequency-demodulating said picked up frequency-modulated signal to produce the combined signal;

c. means for extracting said frequency-converted burst signal from said combined signal;

d. means for generating a reference signal to be used for frequency-reconverting said picked up chrominance signal component;

e. supplying means to supply said burst signal extracted from said combined signal to said reference signal generating means to control the phase of said reference signal;

f. means for frequency-reconverting said picked up intervals of the chrominance signal component with said reference signal to the original frequency band of the chrominance signal.

g. means for delaying said picked up intervals of the chrominance signal component to form delayed replicas of said picked up intervals, and h. means for combining said picked up intervals of the chrominance signals and said delayed replicas to form a continuous signal.

8. The system according to claim 1 comprising, in addition, reproducing means to reproduce the signals recorded on said magnetic medium.

9. A system according to claim 8, wherein said reproducing means comprises:

a. means for picking up said frequency-modulated signal and said frequency-converted chrominance signal from said magnetic medium;

b. means for frequency-demodulating said picked up frequency-modulated signal to reproduce the combined signal of the frequency-converted burst signal and the luminance signal;

c. means for extracting said frequency-converted burst signal from said combined signal;

d. means for generating a reference signal for frequency-reconverting said picked up chrominance signal;

e. supplying means to supply said burst signal extracted from said combined signal to said reference signal generating means to control the phase of said reference signal; and f. means for utilizing said reference signal to frequency-convert said picked up chrominance signal to the original frequency band of the chrominance signal.

10. A system for reproducing a color television signal from a recorded signal that comprises a frequency-modulated signal including a luminance signal and a frequency-converted burst signal combined and frequency-modulated on one carrier, said frequency-modulated signal being combined with a frequency-converted chrominance signal, said system comprising:

a. means for picking up said recorded signal;

b. means for separating said frequency-modulated signal from said frequency-converted chrominance signal;

c. means for frequency-demodulating said frequency-modulated signal to obtain the frequency-converted burst signal;

d. means for generating a reference signal;

e. means for controlling the phase of said reference signal by the frequency-converted burst signal; and f. means for utilizing said reference signal to frequency-reconvert the separated frequency-converted chrominance signal.

11. The system according to claim 10, wherein said means for controlling the frequency of said reference signal comprises means for utilizing said reference signal to frequency-reconvert said burst signal from said frequency-demodulating means to the original burst signal frequency.

12. The system according to claim 11, wherein said reference signal generating means comprises:

a. an oscillator generating a constant frequency signal;

b. a phase detector for comparing in phase said constant frequency signal with said frequency-reconverted burst signal;

c. a variable frequency oscillator controlled by an output of said phase detector and frequency converter for converting the frequency of said constant frequency signal with an output of said variable frequency oscillator.

13. A system for magnetic recording of a composite color television signal including luminance and chrominance and burst signals and being divided into line intervals, each including a blanking interval, said system comprising:

a. means for separating the luminance signal component and the chrominance signal component from the composite color television signal;
b. first converting means to frequency-convert said separated chrominance signal to a frequency band lower than its original one;
c. means for extracting said burst signal from said separated chrominance signal component;
d. second converting means to frequency-convert said extracted burst signal to a frequency lower than its original frequency;
e. means for combining said separated luminance signal and said frequency-converted burst signal into a combined signal;
f. means for frequency-modulating a carrier signal by said combined signal to produce a frequency-modulated signal; and
g. means for combining said frequency-modulated signal and said frequency-converted chrominance signal and for recording both of them on a magnetic medium.

14. The system according to claim 13, wherein said first and second converting means frequency-convert the carrier frequency of said separated chrominance signal and said extracted burst signal, respectively, to the same frequency.

15. A system for magnetic recording of a color television signal comprising a luminance signal in a first frequency band and a chrominance signal and a burst signal, said system comprising:

a. means for frequency-converting said chrominance signal to a frequency band lower than its original one;
b. means for extracting the burst signal from said frequency-converted chrominance signal;
c. means for frequency-modulating a carrier signal by said extracted frequency-converted burst signal; and
d. means supplied with said frequency-modulated signal and said frequency-converted chrominance signal component for recording both of them on a magnetic medium.

16. A system according to claim 15 comprising, in addition, gating means for gating alternating, substantially equal intervals of said chrominance signal component.

17. A system according to claim 15 comprising, in addition, reproducing means to reproduce the signals recorded on said magnetic medium, said reproducing means comprising:

a. means for picking up said frequency-modulated signal and said frequency-converted chrominance signal component from said magnetic medium;
b. means for frequency-demodulating said frequency-modulated signal to produce the frequency-converted burst signal;
c. means for generating a reference signal;
d. means for supplying said burst signal produced by the frequency demodulation to said reference signal generating means to control the phase of said reference signal; and
e. means for frequency-reconverting said picked up frequency-converted chrominance signal component with said reference signal to the original frequency band of the chrominance signal.

* * * * *

UNITED STATES PATENT OFFICE
CERTIFICATE OF CORRECTION

Patent No. 3,786,176 Dated January 15, 1974

Inventor(s) Hisaaki Narahara; Toshihiko Numakura; Yoshimi Watanabe

It is certified that error appears in the above-identified patent and that said Letters Patent are hereby corrected as shown below:

IN THE ABSTRACT

Line 18, change "erros" to --errors--

IN THE SPECIFICATION

Column 4, line 64, change "5" to --6--

Column 6, line 24, after "component" insert --is--

IN THE CLAIMS

Column 10, line 60, after "detector" insert a semicolon (;)

Column 10, line 60, after "and" start a new sub-paragraph and insert --d. a--

Column 11, line 34, after "signal" insert --and said burst signal--

Column 12, line 8, after "chrominance" insert --and burst--. Column 11, line 32, before "said" insert -- in a second frequency band --.

Signed and sealed this 17th day of September 1974.

(SEAL)
Attest:

McCOY M. GIBSON JR.
Attesting Officer

C. MARSHALL DANN
Commissioner of Patents